United States Patent
Matsuda et al.

[11] 4,166,384
[45] Sep. 4, 1979

[54] SEMICONDUCTOR TRANSDUCER

[75] Inventors: Yasumasa Matsuda; Kazuji Yamada; Satoshi Shimada, all of Hitachi; Motohisa Nishihara, Katsuta; Tomio Yasuda, Hitachi; Masatoshi Tsuchiya, Hitachi; Ko Soeno, Hitachi; Mitsuo Ai, Katsuta; Takeo Nagata, Hitachi; Yoshitaka Matsuoka, Mito, all of Japan

[73] Assignee: Hitachi, Ltd., Japan

[21] Appl. No.: 940,077

[22] Filed: Sep. 6, 1978

[30] Foreign Application Priority Data
Sep. 7, 1977 [JP] Japan .................... 52-107439

[51] Int. Cl.$^2$ .................... G01L 1/04; G01L 1/18
[52] U.S. Cl. .................... 73/141 A; 73/760; 73/777
[58] Field of Search .................... 73/141 A, 760, 774, 73/777, 781

[56] References Cited
U.S. PATENT DOCUMENTS

| | | | |
|---|---|---|---|
| 3,446,064 | 5/1969 | Bowman | 73/777 X |
| 4,019,388 | 4/1977 | Hall et al. | 73/777 X |

Primary Examiner—Charles Gorenstein
Attorney, Agent, or Firm—Craig and Antonelli

[57] ABSTRACT

A semiconductor transducer comprising an improved strain-yielding body yielding a strain in response to the impartation of a force or displacement, and a semiconductor strain gauge bonded to the strain-yielding body. The improved strain-yielding body is made of an iron-nickel-cobalt alloy containing 28.2 to 31.0% by weight of nickel and 15.0 to 19.5% by weight of cobalt. This iron-nickel-cobalt alloy is initially heated up to a temperature above 600° C. for the purpose of standard heat treatment for removing its internal strain. After the standard heat treatment, the iron-nickel-cobalt alloy is subjected to cold working at a working rate of more than and including 60%, and is then subjected to heat treatment at a temperature between 350° C. and 600° C. The heat-treated iron-nickel-cobalt alloy is shaped into the predetermined form of the strain-yielding body.

4 Claims, 11 Drawing Figures

SEMICONDUCTOR TRANSDUCER

BACKGROUND OF THE INVENTION

1. Field of the Invention

This invention relates to a semiconductor transducer comprising a semiconductor strain gauge bonded to a strain-yielding body which yields a strain when a force or displacement, is imparted thereto.

2. Description of the Prior Art

Semiconductor transducers are widely used as a means for converting a force, pressure, displacement or the like into an electrical signal. FIG. 1 shows an example of such a semiconductor transducer. The semiconductor transducer shown in FIG. 1 comprises a cantilever 10, a pair of semiconductor strain gauge units 21 and 22, and a die member 30 fixedly supporting the cantilever 10. The semiconductor strain gauge units 21 and 22 are bonded by associated layers 41 and 42 of a bonding material to the upper and lower surfaces respectively of the cantilever 10 adjacent to the base portion 50 of the cantilever 10. The cantilever 10 is fixed at its base portion 50 to the die member 30 by fixing means such as screws 60. When a force W or a displacement input is imparted to the tip or free end of the cantilever 10, the cantilever 10 is deflected, and a tensile strain or a compressive strain proportional to the input is produced in the semiconductor strain gauge unit 21 or 22. Therefore, an electrical signal proportional to the force w or displacement input imparted to the free end of the cantilever 10 can be obtained when the semiconductor strain gauge units 21 and 22 bonded to the upper and lower surfaces of the cantilever 10 are arranged to constitute two arms of a Wheatstone bridge circuit.

In the semiconductor transducer of this kind, the semiconductor strain gauge units 21 and 22 bonded to the cantilever 10 have a low coefficient of thermal expansion of about $3.0 \times 10^{-6} \deg^{-1} C$, and a coefficient of thermal expansion approximately equal to this value is also required for the material of the cantilever 10. Thus, in the prior art semiconductor transducer, Fernico (an alloy of iron, nickel and cobalt) has been generally employed as the material of the cantilever 10.

Such a prior art semiconductor transducer is disclosed in, for example, Japanese Patent Application Kokai (Laid-Open) No. 51-22477 entitled "SEMICONDUCTOR STRAIN GAUGE". In the cited application, cold working is applied to the Fernico material so that, when the semiconductor strain gauge units exhibiting the piezo-resistive effect are bonded to the cantilever of Fernico material, the thermal strain due to the slight difference between the coefficients of thermal expansion of these materials may not be added as an error to the strain value detected by the semiconductor transducer. However, due to the fact that the Fernico material has a poor elastic property compared with that of elastic materials commonly employed and has also a low mechanical strength, the operating characteristics of the semiconductor transducer has been limited by the mechanical property of the Fernico material. Especially, due to the considerable hysteresis and resultant bad linearity of the Fernico material, the operating characteristic of the semiconductor transducer has tended to be degraded with the increase in the range of strain produced in the cantilever, and it has been unable to expect a transducer accuracy higher than 0.5%. Further, the accurately detectable strain range has been limited to about $500 \times 10^{-6}$ in order that the semiconductor transducer can operate with an accuracy of the order of 0.5% when the factors including the linearity, hysteresis and zero-point stability are collectively taken into account.

SUMMARY OF THE INVENTION

It is an object of the present invention to provide a semiconductor transducer comprising a strain-yielding body which can operate with reduced hysteresis as well as reduced nonlinearity and which is suitable for measurement of a strain by a semiconductor strain gauge.

Another object of the present invention is to provide a semiconductor transducer of the above kind in which the strain-yielding body is suitable for having the semiconductor strain gauge bonded thereto by a bonding material.

Still another object of the present invention is to provide a semiconductor transducer of the above kind in which the strain-yielding body is not adversely affected by the bonding temperature during bonding of the semiconductor strain gauge to the strain-yielding body.

The semiconductor transducer according to the present invention comprises a strain-yielding body in the form of a block of an alloy of iron, nickel and cobalt. The block of iron-nickel-cobalt alloy having been subjected to the standard heat treatment described later is subjected to cold working at a working rate of not less than 60%, and then, the block is heat-treated at a temperature between 350° C. and 600° C.

The present invention takes note of the fact that the hysteresis characteristic of the alloy of iron, nickel and cobalt is attributable greatly to the ferro-magnetic property of the alloy of iron and nickel. Thus, the iron-nickel-cobalt alloy forming the strain-yielding body of the present invention is stabilized by being subjected to cold working at a high working rate and then to suitable heat treatment so as to greatly improve the elastic property thereof.

The rate of working on the iron-nickel-cobalt alloy is higher than and including 60%, and the effect becomes more marked with the increase in the rate of working. Especially, when a very high rate of cold working of about 90% is applied to this alloy, the hysteresis characteristic can be improved to an almost negligible extent. Although application of suitable heat treatment to this alloy after the cold working can provide a stable and satisfactory elastic property, the effect of the cold working will be lost when the temperature of heat treatment exceeds a predetermined upper limit. It is considered that the hysteresis characteristic of the alloy can be improved by the high rate of cold working because the adverse effect of magnetostriction can be suppressed by the high rate of cold working, and the internal energy consumption is reduced during the deformation of the cantilever. The term "adverse effect of magnetostriction" refers to appearance of a magnetic force from a ferromagnetic substance in response to the impartation of a force thereto. Impartation of the force to the ferromagnetic substance produces a strain resulting in hysteresis. However, impartation of, for example, a cold working pressure to the ferromagnetic substance is effective in suppressing the adverse effect of magnetostriction thereby greatly reducing the degree of hysteresis.

The material of the strain-yielding body must have a low coefficient of thermal expansion in order to minimize the residual strain resulting from bonding of the semiconductor strain gauge to the strain-yielding body. Suitable composition range of the iron-nickel-cobalt alloy providing the low coefficient of thermal expansion, when stabilized by the application of the high rate of cold working followed by the suitable heat treatment, includes 28.2 to 31.0% by weight of nickel and 15.0 to 19.5% by weight of cobalt. The material of the strain-yielding body in the semiconductor transducer provided by the present invention has the composition range above specified and is not substantially adversely affected by the bonding temperature as described later.

The present invention employs the Fernico material having been subjected to the high rate of cold working higher than and including 60% for the reasons described presently. The Fernico material has an increased tensile strength like stainless steels. The Fernico material has a tensile strength of only about 50 Kg/mm$^2$ when subjected merely to standard heat treatment but not subjected to any cold working. This standard heat treatment includes, for example, heating the material at 900° C. for 1 hour (or heating the material at 600° C. or more for a suitable length of time depending on the material) to remove an internal strain, then heating the material at 1,100° C. in a hydrogen atmosphere for 15 minutes, and allowing to gradually cool. However, this tensile strength can be increased up to about 75 Kg/mm$^2$ when cold rolling at a reduction rate of 60% is applied thereto. The proportional limit of a metal material varies generally in proportion to its tensile strength. Although the Fernico material not subjected to cold rolling but subjected to the standard heat treatment has a proportional limit of 22 Kg/mm$^2$, this value can be increased up to 38 Kg/mm$^2$ when the material is subjected to cold rolling at the reduction rate of 60%.

The proportional limit will be discussed from the side of the semiconductor transducer. The mean value of the difference between the coefficient of linear expansion of the semiconductor strain gauge and that of the Fernico material is $15 \times 16^{-6}$ deg$^{-1}$ C. between the bonding temperature and the room temperature. When, for example, they are bonded together by a eutectic alloy of gold and silicon (Au—Si) at a bonding temperature of 400° C., the residual strain due to bonding is $600 \times 10^{-6}$. The satisfactory strain detection range of the semiconductor strain gauge is $1,500 \times 10^{-6}$. Therefore, the maximum strain of the whole semiconductor transducer is $2,000 \times 10^{-6}$. The strain-yielding body has desirably a proportional limit corresponding to a maximum strain of $2,500 \times 10^{-6}$ when its use at low temperatures and the safety factor are taken into consideration. The Young's modulus of the Fernico material is 1.4 to $1.6 \times 10^4$ Kg/mm$^2$. Therefore, the Fernico used as the material of the strain-yielding body must have a maximum proportional limit of about 35 to 40 Kg/mm$^2$.

For the above reasons, the material of the strain-yielding body in the present invention is limited to the Fernico material subjected to cold working or rolling at a high working rate of more than and including 60%, since the Fernico material subjected to such a high rate of cold rolling provides the desired proportional limit.

DESCRIPTION OF THE PREFERRED EMBODIMENTS

Figure 1:
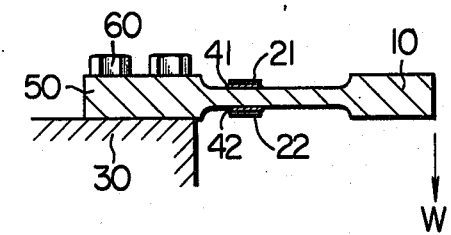
FIG. 1 is a schematic sectional of a semiconductor transducer which comprises a cantilever and semiconductor strain gauge units and to which the present invention is applied.
Figure 2A:
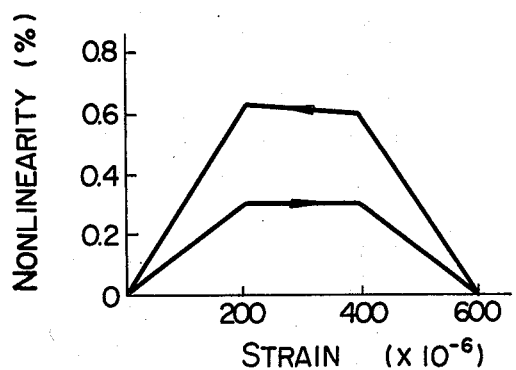
FIGS. 2a, 2b and 2c show the relation between the degree of cold working and the nonlinearity of the iron-nickel-cobalt alloy employed in the prior art and the present invention.
Figure 2B:
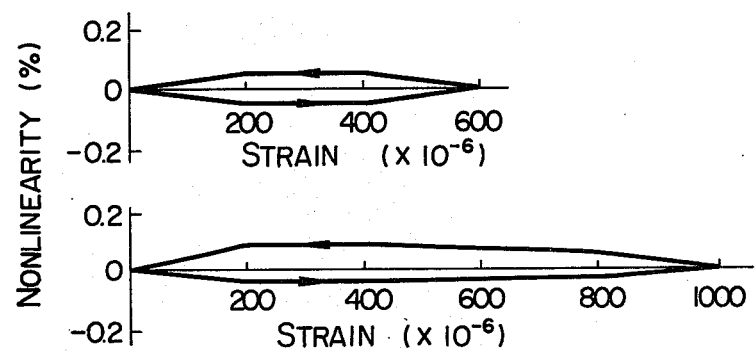
Figure 2C:
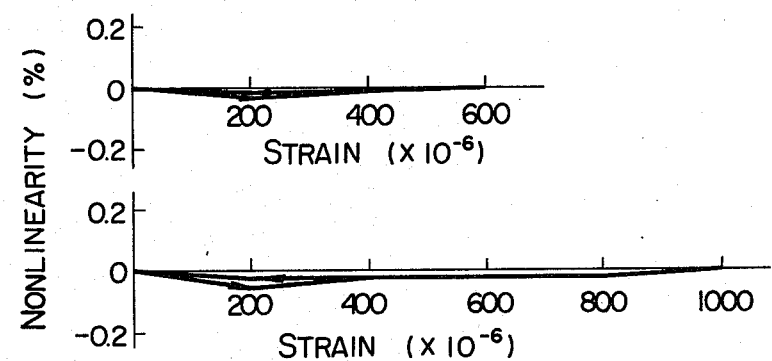

FIGS. 2b and 2c show the results of measurement of the elastic property of the cantilever when an iron-nickel-cobalt alloy containing 29% by weight of nickel and 17% by weight of cobalt was subjected to cold working, shaped into the form shown in FIG. 1 and was then heat-treated at a temperature between 350° C. and 600° C., and a pair of metal strain gauge units having good linearity were bonded thereto. In FIGS. 2b and 2c, the horizontal axis represents the strain range ($\times 10^{-6}$) and the vertical axis represents the nonlinearity error (%), and in each of FIGS. 2b and 2c, two different strain ranges are illustrated. The iron-nickel-cobalt alloy in FIG. 2b was subjected to cold working at a working rate of 60%, while that in FIG. 2c was subjected to cold working at a working rate of 90%. FIG. 2a shows the results of measurement for the sake of comparison, in which the iron-nickel-cobalt alloy of the same composition as that in FIGS. 2b and 2c but not subjected to any cold working was shaped into the same form and then annealed.

In the case of FIG. 2a showing the results of measurement on the iron-nickel-cobalt alloy treated in the usual manner, that is, merely annealed without the cold working, the nonlinearity error was about 0.6%, and the hysteresis was about 0.3%. In contrast, in the case of FIG. 2b showing the results of measurement on the iron-nickel-cobalt alloy subjected to the 60% cold working, the nonlinearily error was less than 0.1%, and the hysteresis was also reduced to about 0.1%. In the case of FIG. 2c showing the results of measurement on the iron-nickel-cobalt alloy subjected to the 90% cold working, the nonlinearity error was about 0.05%, and the hysteresis was also less than about 0.04%. These values are too small to be substantially sensed, and the elastic property can thus be greatly improved.

Figure 3A:
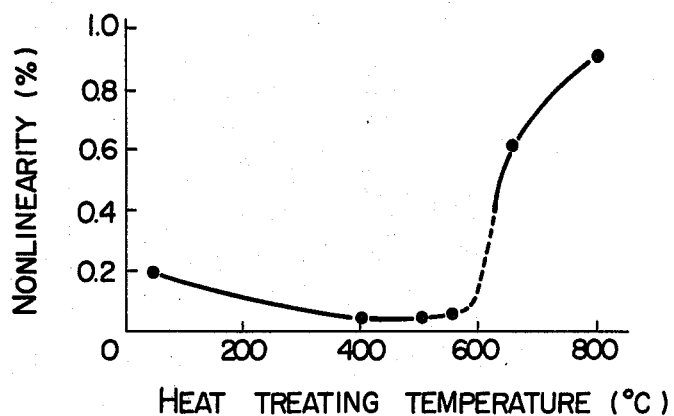
FIGS. 3a and 3b show the relation between the heat treatment temperature and the nonlinearity of the iron-nickel-cobalt alloy employed in the present invention.
Figure 3B:
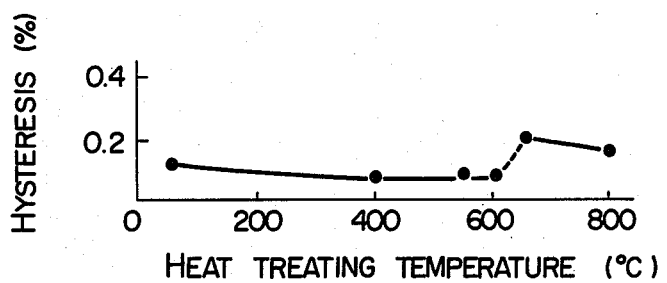

FIGS. 3a and 3b show the relation between the temperature of heat treatment and the elastic property of the iron-nickel-cobalt alloy when subjected to 60% cold working. In FIGS. 3a and 3b, the horizontal axis represents the temperature (°C.) of heat treatment. The vertical axis in FIG. 3a represents the nonlinearity error (%), while that in FIG. 3b represents the hysteresis (%). It will be seen from FIG. 3a that the nonlinearity error decreases with the increase in the temperature of heat treatment, but heat treatment at a temperature higher than 650° C. results in an abrupt increase in the nonlinearity error leading to undesirable deterioration of the elastic property. In other words, the effect of cold rolling is almost lost. The nonlinearity error is smallest and the elastic property is most satisfactory within the heat treatment temperature range of 350° C. to 550° C. This is attributable to the reduced hysteresis within this heat treatment temperature range as will be apparent from FIG. 3b.

Thus, by suitably selecting the temperature of heat treatment on the iron-nickel-cobalt alloy, the material provides a strain-yielding body having a low coefficient of thermal expansion and an excellent elastic property. When the iron-nickel-cobalt alloy is subjected to 90% cold working and then to heat treatment at about 400° C. to 500° C., the elastic property of the material is almost compatible with that of beryllium copper having a nonlinearity error of less than 0.2% and hysteresis of less than 0.2%. The coefficient of thermal expansion of the beryllium copper is $16.5 \times 10^{-6}$ deg$^{-1}$ C which is far larger than that, 3.0 to $3.3 \times 10^{-6}$ deg$^{-1}$ C, of silicon. Thus, bonding of the semiconductor strain gauge to a block of beryllium copper for the measurement of a force or displacement imparted to this block is not suitable from the viewpoint of the temperature characteristic.

Figure 4:
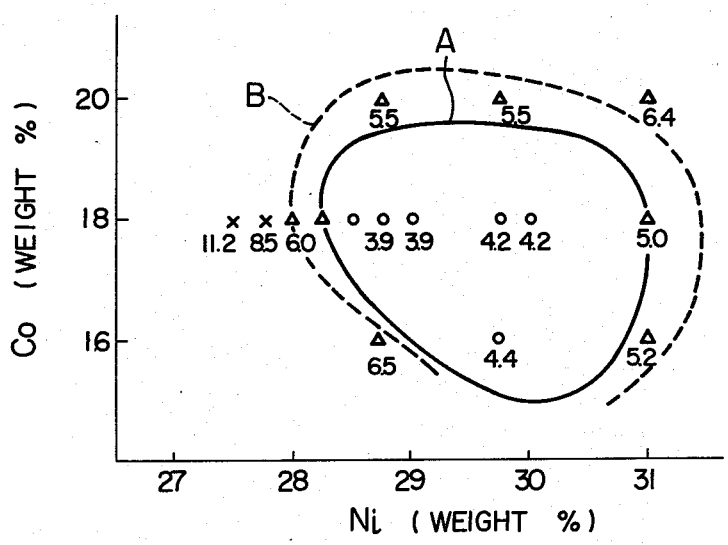
FIG. 4 shows the relation between the composition and the coefficient of thermal expansion of the iron-nickel-cobalt alloy employed in the present invention.

FIG. 4 shows the results of measurement of the coefficient of thermal expansion of the iron-nickel-cobalt alloy containing 29% by weight of nickel and 17% by weight of cobalt, when the contents of nickel and cobalt were used as parameters. In FIG. 4, the horizontal axis represents the nickel content in % by weight, and the vertical axis represents the cobalt content in % by weight. On the curves A and B in FIG. 4, the coefficient of thermal expansion is $5.0 \times 10^{-6}$ deg$^{-1}$ C and $6.0 \times 10^{-6}$ deg$^{-1}$ C respectively. The numeral affixed to each of the individual plotted points represents the coefficient of thermal expansion ($\times 10^{-6}$ deg$^{-1}$ C) at that point. The measurement was made on the iron-nickel-cobalt alloy subjected to 90% cold working and then to heat treatment at 400° C. Suppose that the semiconductor strain gauge has a coefficient of thermal expansion of about $3 \times 10^{-6}$ deg$^{-1}$ C, then, the residual strain $\epsilon$ after bonding of the strain gauge to the strain-yielding body is given by $$\epsilon = (\alpha_c - 3.0) \times \Delta T \times 10^{-6} \quad (1)$$

where $\alpha_c$ is the coefficient of thermal expansion of the strain-yielding body, T is the bonding temperature, $T_o$ is the room temperature, and $\Delta T = T - T_o$. The bonding temperature is about 400° C. to 450° C. since the eutectic reaction of gold-silicon, gold-germanium or the like is generally utilized for bonding the semiconductor strain gauge to the strain-yielding body. Therefore, the difference $\Delta T = T - T_o$ will be about 400° C., and the strength or property of the semiconductor strain gauge or the bonding layer will not be seriously adversely affected when the residual strain $\epsilon$ after bonding is limited to about 700 to $800 \times 10^{-6}$. This fact has been experimentally affirmed. Thus, when the coefficient of thermal expansion $\alpha_c$ of the strain-yielding body is computed on the basis of these results, it is the essential condition that $\alpha_c$ be less than $5.0 \times 10^{-6}$ deg$^{-1}$ C.

The value of the coefficient of thermal expansion $\alpha_c$ satisfying this essential condition of less than $5.0 \times 10^{-6}$ deg$^{-1}$ C lies within the region surrounded by the curve A in FIG. 4, and the nickel and cobalt contents in this region are 28.2 to 31.0% by weight and 15.0 to 19.5% by weight respectively. Presence of unnecessary impurities over certain limits results in a fluctuation of the elastic property or coefficient of thermal expansion and further adversely affects the process of bonding the semiconductor strain gauge to the strain-yielding body. Thus, in the alloy used in the measurement, the contents of major impurities such as manganese and silicon were limited to not more than 0.5% by weight and 0.2% by weight respectively, and it was confirmed that the contents of such impurities below these limits did not give rise to non-uniform bonding.

Figure 5A:
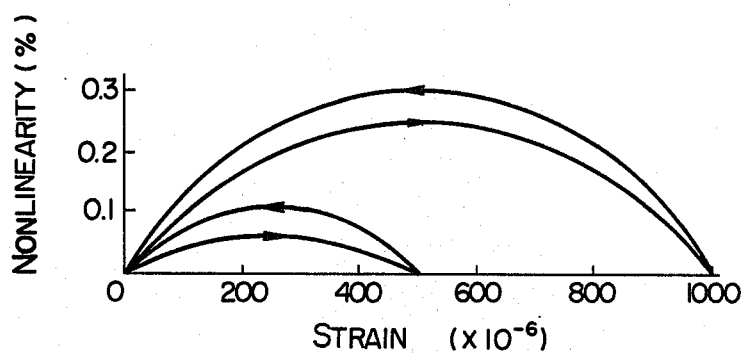
FIGS. 5a and 5b show the relation between the strain and the nonlinearity of the semiconductor transducer of the present invention at different rates of cold working.
Figure 5B:
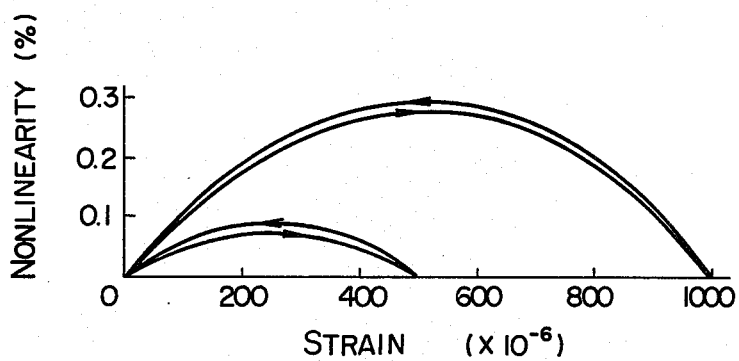

FIGS. 5a and 5b show the relation between the strain and the nonlinearity of the semiconductor transducer shown in FIG. 1 when the material of the cantilever was the iron-nickel-cobalt alloy containing 29% by weight of nickel and 17% by weight of cobalt, and diffused semiconductor strain gauge chips were bonded to the cantilever utilizing the eutectic reaction of gold-germanium. In FIGS. 5a and 5b, the horizontal axis represents the strain range, and the vertical axis represents the nonlinearity error. FIG. 5b shows the results of measurement when the alloy was subjected to 60% cold working, while FIG. 5b shows those when the alloy was subjected to 90% cold working, and two hysteresis curves corresponding to different strain ranges are shown in each of FIGS. 5a and 5b.

It will be seen from FIGS. 5a and 5b, that the nonlinearity error is only about 0.1% when the strain range is about $500 \times 10^{-6}$, because the nonlinearity error of the diffused semiconductor strain gauge units is predominant, and the hysteresis characteristic can be improved by the cold working on the iron-nickel-cobalt alloy which is the material of the cantilever. This provides a great improvement in the zero-point stability of the semiconductor transducer shown in FIG. 1. Thus, although a zero-point variation of about $\pm 3\%$ has occurred relative to the strain produced in the strain-yielding body due to an alternately imparted force or displacement when the alloy is not subjected to cold rolling, this zero-point variation can be reduced to about $\pm 1\%$ and about $\pm 0.05\%$ when the alloy is subjected to 60% cold rolling and 90% cold rolling respectively.

Figure 6A:
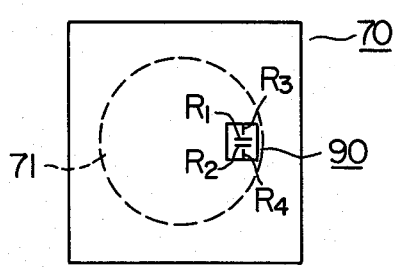
FIGS. 6a and 6b show another form of the semiconductor transducer to which the present invention is applied.
Figure 6B:
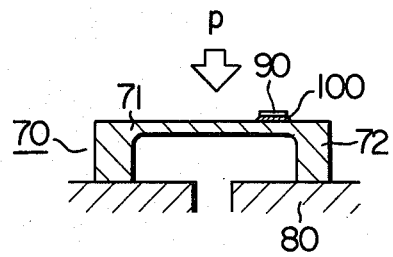

FIGS. 6a and 6b show an application of the present invention to another form of the semiconductor transducer. Referring to FIGS. 6a and 6b, a pressure transducer comprises a disc-shaped diaphragm 70 of metal having a thin-walled central portion 71 and fixed to a supporting die member 80 at its outer peripheral portion 72, and a semiconductor strain gauge 90 bonded by a layer of a bonding material 100 to a suitable point on the thin-walled central portion 71 of the diaphragm 70. The semiconductor strain gauge 90 comprises a pair of radial strain gauge units $R_1$ and $R_2$ extending in the radial direction of the diaphragm 70 and another pair of tangential strain gauge units $R_3$ and $R_4$ extending in the tangential direction of the diaphragm 70, so that the resistance values of these pairs vary in opposite directions in response to the deformation of the diaphragm 70 due to impartation of a pressure P. Therefore, an electrical signal proportional to the pressure P can be obtained when these strain gauge units $R_1$ to $R_4$ are arranged to constitute four active arms of a Wheatstone bridge circuit. These strain gauge units $R_1$ to $R_4$ are mounted in various directions determined by the crystal plane of the semiconductor.

When the disc-shaped diaphragm 70 of the pressure transducer having such a construction is made of the iron-nickel-cobalt alloy treated in the manner described with reference to the aforementioned embodiment, the semiconductor strain gauge 90 can be satisfactorily bonded to this diaphragm 70 which acts as a strain-yielding body having a low coefficient of thermal expansion and an excellent elastic property. Thus, this pressure transducer can operate as effectively as the aforementioned embodiment. That is, in such a pressure transducer, the elastic property of the metal diaphragm is the principal factor determining the operating characteristic of the transducer, and the pressure transducer can operate with a very high accuracy by virtue of the improved elastic property of the material forming the metal diaphragm.

It will be understood from the foregoing detailed description that the present invention provides a strain-yielding body of an alloy having a low coefficient of thermal expansion which provides a small nonlinearity error, which is excellent in the linearity, which operates with reduced hysteresis and to which semiconductor strain gauge chips can be satisfacotrily bonded. Therefore, the combination of such a strain-yielding body with a semiconductor strain gauge provides a semiconductor transducer which can operate with reduced hysteresis and minimized zero-point variation and which can measure the strain over a wide range.

We claim:

1. A semiconductor transducer comprising a cantilever yielding a strain in response to the impartation of a force or displacement, said cantilever being manufactured from a block of an iron-nickel-cobalt alloy subjected to standard heat treatment including heating the block up to a temperature above 600° C. for removing its internal strain, at least one pair of semiconductor strain gauge units exhibiting a piezoresistive effect, said semiconductor strain gauge units being bonded to at least one of the surfaces of said cantilever, and a die member fixedly supporting said cantilever thereon, wherein said block providing said cantilever is subjected to cold working at a working rate of more than and including 60% after said standard heat treatment and is then subjected to heat treatment at a temperature between 350° C. and 600° C.

2. A semiconductor transducer as claimed in claim 1, wherein said iron-nickel-cobalt alloy contains 28.2 to 31.0% by weight of nickel and 15.0 to 19.5% by weight of cobalt.

3. A semiconductor transducer comprising a disc-shaped diaphragm yielding a strain in response to the impartation of a force or displacement, at least one pair of semiconductor strain gauge units exhibiting a piezoresistive effect, said semiconductor strain gauge units being bonded to one of the surfaces of said disc-shaped disphragm, and a die member fixedly supporting said disc-shaped diaphragm, wherein said disc-shaped diaphragm is manufactured from a block of an iron-nickel-cobalt alloy subjected to standard heat treatment including heating the block up to a temperature above 600° C. for removing its internal strain, said block being then subjected to cold working at a working rate of more than and including 60% and finally subjected to heat treatment at a temperature between 350° C. and 600° C.

4. A semiconductor transducer as claimed in claim 3, wherein said iron-nickel-cobalt alloy contains 28.2 to 31.0% by weight of nickel and 15.0 to 19.5% by weight of cobalt.

* * * * *